US007781054B2

(12) United States Patent
Reuter et al.

(10) Patent No.: US 7,781,054 B2
(45) Date of Patent: Aug. 24, 2010

(54) COATING THAT CONTAINS A COLLOIDALLY DISPERSED METALLIC BISMUTH

(75) Inventors: Hardy Reuter, Münster (DE); Karl-Heinz Grosse-Brinkhaus, Nottuln (DE); Ulrich Heimann, Münster (DE); Dagmar Schemschat, Münster (DE); Rolf Döring, Nottuln (DE); Walter Jouck, Münster (DE)

(73) Assignee: BASF Coatings GmbH, Muenster (DE)

( * ) Notice: Subject to any disclaimer, the term of this patent is extended or adjusted under 35 U.S.C. 154(b) by 989 days.

(21) Appl. No.: 10/169,211

(22) PCT Filed: Dec. 7, 2000

(86) PCT No.: PCT/EP00/12329

§ 371 (c)(1), (2), (4) Date: Jun. 27, 2002

(87) PCT Pub. No.: WO01/51570

PCT Pub. Date: Jul. 19, 2001

(65) Prior Publication Data

US 2003/0082368 A1     May 1, 2003

(30) Foreign Application Priority Data

Jan. 14, 2000   (DE) ................. 100 01 222

(51) Int. Cl.
 *B32B 15/08*   (2006.01)
(52) U.S. Cl. ................. 428/328; 428/323; 428/332; 428/457
(58) Field of Classification Search ................. 428/457, 428/339, 332, 334, 458
See application file for complete search history.

(56) References Cited

U.S. PATENT DOCUMENTS

| 4,036,795 | A | 7/1977 | Tominage ............... 523/415 |
| 4,134,865 | A | 1/1979 | Tominage ............... 260/18 PN |
| 4,617,331 | A | 10/1986 | Boberski et al. ............ 523/420 |
| 4,788,083 | A | 11/1988 | Dammann et al. .......... 427/340 |
| 5,330,839 | A | 7/1994 | Yasuoka et al. ............. 428/413 |
| 5,405,701 | A | 4/1995 | Fujibayashi et al. ......... 428/418 |
| 5,554,700 | A | 9/1996 | Schipfer et al. ............. 525/360 |
| 5,670,441 | A | 9/1997 | Foedde et al. ............... 502/200 |
| 5,702,581 | A | 12/1997 | Kerlin et al. ................ 204/486 |
| 5,773,090 | A | 6/1998 | Buttner et al. .............. 427/327 |
| 5,889,024 | A | 3/1999 | Miller et al. ................ 514/326 |
| 5,908,912 | A | 6/1999 | Kollah et al. .................. 528/45 |
| 5,936,013 | A | 8/1999 | Feola et al. ................. 523/414 |
| 6,017,432 | A * | 1/2000 | Boyd et al. ................. 204/501 |
| 6,624,215 | B1 * | 9/2003 | Hiraki et al. ................ 523/414 |

FOREIGN PATENT DOCUMENTS

| CA | 1338690 | 11/1996 |
| DE | EP 264 834 | 10/1987 |
| DE | 3726635 | 2/1989 |
| DE | 4434593 | 4/1996 |
| EP | 0 390 216 | 3/1990 |
| GB | 1260492 | 12/1968 |
| WO | WO96/10057 | 4/1996 |
| WO | WO00/37571 | 6/2000 |

OTHER PUBLICATIONS

English Abstract for DE3726635, Feb. 23, 1989.
English Abstract for DE4434593 and WO96/10057 on the front page of the international Publication, Apr. 4, 1996.

* cited by examiner

*Primary Examiner*—Monique R Jackson
(74) *Attorney, Agent, or Firm*—Harness, Dickey & Pierce, P.L.C.

(57) ABSTRACT

The invention relates to a coating that is produced from a thermally curable, aqueous coating material on an organic basis, and that contains colloidally dispersed metallic bismuth. The invention further relates to the use thereof as anticorrosive coating on metal substrates.

5 Claims, No Drawings

COATING THAT CONTAINS A COLLOIDALLY DISPERSED METALLIC BISMUTH

This application is a National Phase Application of Patent Application PCT/EP00/12329 filed on 7 Dec. 2000.

The present invention relates to a novel coating preparable from a thermally curable, organic-based aqueous coating material and comprising colloidally dispersed metallic bismuth. The present invention further relates to the use of the novel coating as a corrosion protection layer on metallic substrates. The present invention additionally relates to a process for preparing the novel coating.

Corrosion protection layers preparable from a thermally curable, organic-based aqueous coating material, especially on the basis of electrocoat materials, and comprising metal dusts, especially zinc dust, are known from the article by M. Leclerq, "Properties of zinc dust pigments", Farbe+Lack, Volume 97, 1991, Number 5, pages 408 et seq. The metal dusts are mixed with the thermally curable aqueous coating materials prior to the production of the corrosion protection layers, and not generated only during their production. Adding the metal dusts constitutes an additional process step, which is a disadvantage both technically and economically. Moreover, the handling of metal dusts presents safety problems.

German Patent DE 37 26 635 A1 discloses a coating comprising magnetic iron oxide particles and preparable from electrocoat materials. The use of bismuth particles is not disclosed by said patent.

The use of bismuth compounds in the curing of thermally curable, organic-based coating materials is known from patents DE 37 09 631 A1, EP 0 337 442 A3, EP 0 138 193 B1 or U.S. Pat. No. 5,405,701 A. The patents do not disclose that metallic bismuth is formed during the thermal curing of the coating materials in question.

The use of bismuth salts as catalysts for the thermal curing of cataphoretic electrocoat materials comprising water-soluble or water-dispersible hydroxyl-containing polyamine binders and blocked polyisocyanate crosslinking agents are known from patents DE 44 23 139 A1, EP 0 690 106 A1, EP 0 337 422 A1, DE 43 30 002 C1, DE 44 34 593 A1, EP 0 739 891 B1, U.S. Pat. No. 5,702,581 A, WO 95/07319, WO 95/33083, WO 96/10057, EP 0 642 558 B1, EP 0 717 794 B1, U.S. Pat. No. 5,554,700 A, WO 93/24578, WO 95/07377, U.S. Pat. No. 4,617,331 A, U.S. Pat. No. 5,908,912 A, WO 98/10024, EP 0 264 834 B1, DE 25 41 234 A1 or EP 0 509 437 A1.

On page 2, lines 29 to 31, of European Patent EP 0 642 558 B1 it is stated that the selection of bismuth compounds which can be used in cataphoretically depositable electrocoat materials is very limited. For instance, the more readily available bismuth salts of relatively long-chain acids such as octanoic acid or neodecanoic acid are said, when used in cationic binders, to cause defects in the coating film as a result of oillike deposits. Thus it virtually advises against the use of such bismuth salts.

The formation of colloidally dispersed metallic bismuth during the production of coatings from these known cataphoretic electrocoat materials is not described in the patents listed above.

The known cataphoretic electrocoat materials exhibit good wet adhesion and a good throwing power. They can be thermally cured at comparatively low temperatures. The resultant coatings have good corrosion protection properties. For the solution of particularly weighty corrosion problems, such as occur, for example, in the course of long-term exposure of metallic substrates to salt aerosols and/or acidic aerosols and/or salt spray water or acidic spray water, however, it is frequently necessary to add specific anticorrosion pigments as well, this being referred to, inter alia, as "heavy corrosion protection". Particularly effective anti-corrosion pigments generally include ecologically objectionable heavy metals such as tin, chromium or lead, which for producers and the users of cataphoretic electrocoat materials leads increasingly to safety-related problems in production, processing, and disposal.

There is therefore a growing demand for coatings which ensure reliable heavy corrosion protection even without the use of anticorrosion pigments or metal dusts that are objectionable ecologically and from a safety stand-point, and do so under critical conditions, without losing the above-described advantages of the known cataphoretic electrocoat materials.

It is an object of the present invention to provide coatings which meet this demand.

Found accordingly has been the novel coating preparable from a thermally curable, organic-based aqueous coating material and comprising colloidally dispersed metallic bismuth.

The novel coating is referred to below as "coating of the invention".

Further subject matter of the invention will emerge from the description.

In the light of the prior art it was surprising and unforeseeable for the skilled worker that the object on which the present invention is based could be achieved through the use of colloidally dispersed metallic bismuth in an organic-based coating. Even more surprising was that the colloidally dispersed metallic bismuth was comparatively easy to produce during the application and thermal curing of organic-based aqueous coating materials on electrically conducting and electrically nonconducting substrates, with the bismuth salts which were a starting point in accordance with the invention also taking on the role of catalysts for the thermal cure. Also surprising was that heavy corrosion protection is realisable even with comparatively small amounts of metallic bismuth.

The inventively essential constituents of the coating of the invention is the colloidally dispersed metallic bismuth. Regarding the term "colloidal", refer to Römpp Lexikon Lacke und Druckfarben, Georg Thieme Verlag, Stuttgart, N.Y., "Colloids", pages 327 and 328. The metallic nature of the bismuth can be shown from the X-ray diffraction in accordance with the Debye-Scherrer method on the basis of six characteristic lines in the X-ray spectrum, including the three most intensive. According to the compilation by R. Sailer and G. McCarthy, North Dakota State University, Fargo (1992), 1998 JCPDS—International Centre for Diffraction Data, these are:

Lattice spacing d Intensity
(nm)

| | |
|---|---|
| 32.8 | ssss |
| 22.73 | ss |
| 23.69 | s |
| 18.686 | |
| 16.505 | |
| 15.565 | | ssss-sss = very very strong;
ss = very strong;
s = strong;

The amount of colloidally dispersed metallic bismuth in the coatings of the invention may vary widely. At the bottom end it is limited only by the amount of bismuth salts needed for rapid thermal curing at comparatively low temperatures and/or for heavy corrosion protection which is just sufficient. At the top end it is basically limited only by economic considerations: accordingly, the amount of bismuth salts will not be raised beyond the amount necessary for very good heavy corrosion protection, since this makes no sense economically or technically. Based in each case on the coating of the invention, the amount is preferably from 0.01 to 2.5%, more preferably from 0.02 to 2.3%, and in particular from 0.05 to 2.2% by weight.

The film thickness of the coating of the invention may likewise vary widely and is guided in particular by the film thickness required in the case in hand for very good heavy corrosion protection. The film thickness is preferably from 2.0 to 200, more preferably from 5 to 150, and in particular from 10 to 100 μm.

The coating of the invention is preparable from a thermally curable organic-based aqueous coating material.

For this purpose the coating material is deposited in a customary and known way, preferably by spraying, knife coating, brushing, flow coating, dipping, impregnating, trickling or rolling, as a wet film, to electrically conductive and electrically nonconductive substrates. Or else the coating material is deposited in a customary and known way cataphoretically on electrically conductive substrates, as a wet film. Suitable methods of cataphoretic deposition of coating materials are known from the patents cited at the outset.

The thickness of the wet film is guided in particular by the film thickness which the coating of the invention produced therefrom is to have. It may therefore vary very widely as a function of its respective solids content.

Examples of suitable electrically nonconductive substrates are shaped parts of glass, ceramic, wood and/or plastics.

Examples of suitable electrically conductive substrates are shaped parts of metals and/or plastics which comprise electrically conductive pigments.

In this context the coatings of the invention are suitable in particular for the corrosion protection of shaped parts of metals, especially automobile bodies or coils, packaging and other parts for private or industrial use such as metal furniture, radiators, domestic appliances, small metal parts, hubcaps or wheel rims.

The thermal curing of the applied wet films may take place after a certain rest time. This may have a duration of from 30 s to 2 h, preferably from 1 min to 1 h, and in particular from 1 min to 30 min. The rest time serves, for example, for the leveling and devolatilization of the applied wet films or for the evaporation of volatile constituents such as solvents or water. The rest time may be assisted and/or shortened by the application of elevated temperatures up to 100° C., provided this does not entail any damage to or change in the applied wet films, such as premature crosslinking.

Thermal curing of the applied wet films takes place in accordance with the customary and known methods such as heating in a forced air oven or irradiation using IR lamps. Advantageously, thermal curing takes place at a temperature of >90° C., preferably from 90 to 200° C., with particular preference from 110 to 190° C., and in particular from 120 to 180° C. for a time from 1 min up to 2 h, with particular preference 2 min up to 1 h, and in particular 3 min to 30 min.

Basically, the material composition of the thermally curable, organic-based aqueous coating material for use in accordance with the invention is arbitrary, provided it can be processed in the manner described above to give the coatings of the invention described above. In the context of the present invention, the term "organic-based" emphasizes the fact that the profile of properties of the coating material and of the coatings of the invention produced from it is determined primarily by the organic constituents, with the inorganic constituents appropriately varying this profile of properties.

Particularly advantageous coatings of the invention are obtained in a particularly reliable and elegant manner if the thermally curable, organic-based aqueous coating material comprises A) at least one water-soluble or water-dispersible, hydroxyl-containing, oligomeric and/or polymeric polyamine as binder, neutralized with formic acid, B) at least one salt of bismuth and at least one alkanemonocarboxylic acid having at least 5 carbon atoms in the molecule, as thermal crosslinking catalyst, C) at least one blocked polyisocyanate as crosslinking agent, and D) at least one additive.

Particular advantages result if these aqueous coating materials are in the form of cataphoretically depositable electrocoat materials. Further advantages result if the solids content of the electrocoat materials is from 5.0 to 50% by weight.

Examples of suitable polyamines (A) are known from patents EP 0 082 291 A1, EP 0 234 395 A1, EP 0 227 975 A1, EP 0 178 531, EP 333 327 A1, EP 0 310 971 A1, EP 0 337 422 A2, EP 0 456 270 A1, 3,922,253 A1, EP 0 261 385 A1, EP 0 245 786 A1, DE 33 24 211 A1, EP 0 414 199 A1 or EP 476 514 A1. They are preferably resins (A) containing primary, secondary, tertiary or quaternary ammonium groups, having amine numbers of preferably between 20 and 250 mg KOH/g and a weight-average molecular weight of preferably from 300 to 10 000 daltons. In particular, amino (meth)acrylate resins, amino epoxy resins, amino epoxy resins with terminal double bonds, amino polyurethane resins, amino-containing polybutadiene resins or modified epoxy resin-carbon dioxide-amine reaction products are employed.

In accordance with the invention, very particular preference is given to using the amino epoxy resins such as are obtainable from epoxy resins and polyfunctional amines.

In accordance with the invention, the polyamines (A) are fully or partly neutralized with formic acid. The degree of neutralization is guided in particular by the amount of formic acid required to render the binders (A) soluble or dispersible in water.

The fraction of the polyamines (A) in the electrocoat materials for use in accordance with the invention may vary very widely. In accordance with the invention it is of advantage to employ the polyamines (A) in the amounts such as are known from the patents listed above.

The coating materials for use in accordance with the invention, especially the electrocoat materials, comprise at least one salt (B) of bismuth with at least one alkanemonocarboxylic acid having at least five carbon atoms in the molecule. In accordance with the invention the salt (B) serves as thermal crosslinking catalyst and as the supplier of the inventively essential, colloidally dispersed metallic bismuth of the coatings of the invention. In the coating materials for use in accordance with the invention it is therefore employed in an amount which on the one hand ensures the catalytic effect and on the other hand provides the above-described amount of metallic bismuth. The skilled worker is therefore able with ease to determine the particular appropriate amount of salt (B) in a simple manner, where appropriate with the assistance of simple preliminary rangefinding tests.

Examples of suitable alkanemonocarboxylic acid are n-valeric acid, isovaleric acid, 2-methylbutyric acid, pivalic acid, n-hexanoic acid, n-heptanoic acid, n-octanoic acid, 2-ethylhexanoic acid, nonanoic acid, capric acid, neodecanoic acid and/or lauric acid, especially 2-ethylhexanoic acid. It is also possible to employ even higher alkanemonocarboxylic acids, preferably together with the above-described alkanemonocarboxylic acids.

It is of advantage in accordance with the invention if the salts (B) are present in solution in an excess of the above-described alkanemonocarboxylic acids. Further advantages result if in each case the alkanemonocarboxylic carboxylic acid used is the acid which also forms the anion of the salt (B). The amount of salt (B) in the resulting mixture, based on the mixture, is preferably from 10 to 95%, more preferably from 15 to 90%, and in particular from 20 to 85% by weight.

The advantageous effect of the salts (B) for use in accordance with the invention is especially surprising in view of their reputed tendency to cause defects in the coatings as a result of oillike deposits.

The coating materials for use in accordance with the invention, especially the electrocoat materials, comprise at least one blocked polyisocyanate crosslinking agent (C).

Examples of suitable crosslinking agents (C) derive from what are known as paint polyisocyanates, having aliphatically, cycloaliphatically, araliphatically and/or aromatically attached, blocked isocyanate groups.

Examples of suitable paint polyisocyanates are diisocyanates, especially hexamethylenediisocyanate, isophorone diisocyanate, 2-isocyanatopropylcyclohexyl isocyanate, dicyclohexylmethane 2,4'-diisocyanate, dicyclohexylmethane 4,4'-diisocyanate or 1,3-bis-(isocyanatomethyl)cyclohexane (BIC), diisocyanates derived from dimer fatty acids, such as are sold by Henkel under the commercial designation DDI 1410, 1,8-diisocyanato-4-isocyanatomethyloctane, 1,7-diisocyanato-4-isocyanatomethylheptane, 1-isocyanato-2-(3-isocyanatopropyl)cyclohexane, tolylene diisocyanate, xylylene diisocyanate, bisphenylene diisocyanate, naphthylene diisocyanate or diphenylmethane diisocyanate or mixtures of these polyisocyanates.

Particular preference is given to using paint polyisocyanates containing on average per molecule more than 2, in particular from 2.5 to 5, isocyanate groups and having viscosities of from 100 to 10 000, preferably from 100 to 5000, and in particular from 100 to 2000 mPas (at 23° C.). Moreover, they may have been hydrophilically or hydrophobically modified in a customary and known way.

They are preferably prepared from the abovementioned diisocyanates and contain isocyanurate, biuret, allophanate, iminooxadiazinedione, urethane, urea and/or uretdione groups. Polyisocyanates containing urethane groups, for example, are obtained by reacting some of the isocyanate groups of the diisocyanate with polyols, such as butyl diglycol, trimethylolpropane and/or glycerol, for example. Further examples of suitable preparation processes are known from patents CA-A-2,163,591, U.S. Pat. Nos. 4,419,513, 4,454,317, EP-A-0 646 608, U.S. Pat. No. 4,801,675, EP-A-0 183 976, DE-A-40 15 155, EP-A-0 303 150, EP-A-0 496 208, EP-A-0 524 500, EP-A-0 566 037, U.S. Pat. Nos. 5,258,482, 5,290,902, EP-A-0 649 806, DE-A-42 29 183 or EP-A-0 531 820.

Examples of suitable blocking agents for preparing the blocked polyisocyanates (B) are the blocking agents known from the U.S. Pat. No. 4,444,954, such as i) phenols such as phenol, cresol, xylenol, nitrophenol, chlorophenol, ethylphenol, t-butylphenol, hydroxybenzoic acid, esters of this acid or 2,5-di-tert-butyl-4-hydroxytoluene;

ii) lactams, such as ε-caprolactam, δ-valerolactam, γ-butyrolactam or β-propiolactam;

iii) active methylenic compounds, such as diethyl malonate, dimethyl malonate, ethyl or methyl acetoacetate or acetylacetone;

iv) alcohols such as methanol, ethanol, n-propanol, isopropanol, n-butanol, isobutanol, t-butanol, n-amyl alcohol, t-amyl alcohol, lauryl alcohol, trimethylolpropane, glycerol, butyl diglycol, ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, propylene glycol monomethyl ether, methoxymethanol, glycolic acid, glycolic esters, lactic acid, lactic esters, methylolurea, methylolmelamine, diacetone alcohol, ethylenechlorohydrin, ethylenebromohydrin, 1,3-dichloro-2-propanol, 1,4-cyclohexyldimethanol or acetocyanohydrin;

v) mercaptans such as butylmercaptan, hexylmercaptan, t-butylmercaptan, t-dodecyl mercaptan, 2-mercaptobenzothiazole, thiophenol, methylthiophenol or ethylthiophenol;

vi) acid amides such as acetoanilide, acetoanisidinamide, acrylamide, methacrylamide, acetamide, stearamide or benzamide;

vii) imides such as succinimide, phthalimide or maleimide;

viii) amines such as diphenylamine, phenylnaphthylamine, xylidene, n-phenylxylidine, carbazole, aniline, naphthylamine, butylamine, dibutylamine or butylphenylamine;

ix) imidazoles such as imidazole or 2-ethylimidazole;

x) ureas such as urea, thiourea, ethyleneurea, ethylenethiourea or 1,3-diphenylurea;

xi) carbamates such as phenyl N-phenylcarbamate or 2-oxazolidone;

xii) imines such as ethyleneimine;

xiii) oximines such as acetone oxime, formaldoxime, acetaldoxime, acetoxime, methyl ethyl ketoxime, diisobutyl ketoxime, diacetyl monoxime, benzophenone oxime or chlorohexanone oximes;

xiv) salts of sulfurous acid such as sodium bisulfite or potassium bisulfite;

xv) hydroxamic esters such as benzyl methacrylohydroxamate (BMH) or allyl methacrylohydroxamate; or xvi) substituted pyrazoles, imidazoles or triazoles; and also vvii) mixtures of these blocking agents, especially dimethylpyrazole and triazoles, malonates and acetoacetates, dimethylpyrazole and succinimide or butyl diglycol and trimethylolpropane.

The fraction of the crosslinking agents (C) in the electrocoat materials for use in accordance with the invention may vary very widely and is guided in particular by the functionality of the binder (A). In accordance with the invention it is of advantage to employ the crosslinking agents (C) in the amounts such as are known from the patents listed above. The skilled worker is therefore able to determine the amount of the crosslinking agents (B) on the basis of his or her general art knowledge, where appropriate with the assistance of simple rangefinding tests.

The coating materials for use in accordance with the invention, especially the electrocoat materials, further comprise at least one additive (D).

Examples of suitable additives (D) are additional crosslinking agents (D) such as all known aliphatic and/or cycloaliphatic and/or aromatic polyepoxides, tris(alkoxycarbonylamino)triazines (TACT), amino resins, examples being melamine, guanamine, benzoguanamine or urea resins, beta-hydroxyalkylamides or compounds containing on average at least two groups capable of transesterification, examples being reaction products of malonic diesters and polyisocyanates or of esters and partial esters of polyhydric alcohols of malonic acid with monoisocyanates, such as are described by European Patent EP-A-0 596 460.

Further examples of suitable additives (D) are organic and/or inorganic pigments, anticorrosion pigments and/or fillers such as calcium sulfate, barium sulfate, silicates such as talc or kaolin, silicas, oxides such as aluminum hydroxide or magnesium hydroxide, nanoparticles, organic fillers such as textile fibers, cellulose fibers, polyethylene fibers or wood flour, titanium dioxide, carbon black, iron oxide, zinc phosphate or lead silicate; these additives may also be incorporated into the electrocoat materials of the invention by way of pigment pastes, in which case suitable grinding resins include the binders (A) described above;

free-radical scavengers;

organic corrosion inhibitors;

additional crosslinking catalysts such as organic and inorganic salts and complexes of tin, of lead, of antimony, of iron or of manganese, preferably organic salts and complexes of tin, especially dibutyltin oxide or dibutyltin dilaurate;

slip additives;

polymerization inhibitors;

defoamers;

emulsifiers, especially nonionic emulsifiers such as alkoxylated alkanols and polyols, phenols and alkylphenols or anionic emulsifiers such as alkali metal salts or ammonium salts of alkanecarboxylic acids, alkanesulfonic acids, and sulfo acids of alkoxylated alkanols and polyols, phenols and alkylphenols;

wetting agents such as siloxanes, compounds containing fluorine, carboxylic monoesters, phosphates, polyacrylic acids and their copolymers or polyurethanes;

adhesion promoters;

leveling agents;

film-forming auxiliaries such as cellulose derivatives;

flame retardants;

organic solvents;

low molecular mass, oligomeric, and high molecular mass reactive diluents which are able to participate in the thermal crosslinking, especially polyols such as tricyclodecanedimethanol, dendrimeric polyols, hyperbranched polyesters, polyols based on metathesis oligomers or branched alkanes having more than eight carbon atoms in the molecule;

anticrater agents; or polyvinyl alcohols.

Further examples of suitable coatings additives are described in the textbook "Lackadditive" [Additives for coatings] by Johan Bieleman, Wiley-VCH, Weinheim, N.Y. 1998.

The preparation of the coating materials for use in accordance with the invention, especially of the electrocoat materials, has no special features but instead takes place in a customary and known manner by mixing of the above-described constituents in suitable mixing units such as stirred tanks, dissolvers, stirrer mills or extruders and dispersing of the resultant mixture in water.

Besides its outstanding corrosion protection effect, the coating of the invention also displays excellent overcoatability with other coating materials such as liquid conventional or aqueous or solid surfacers, basecoat materials and/or clearcoat materials. In this context the coating material for use in accordance with the invention may be overcoated without prior thermal curing, as a wet film, after which the wet film is baked together with the films applied to it (wet-on-wet technique). The resultant multicoat paint systems of the invention exhibit outstanding intercoat adhesion.

A further field of use for the coating of the invention is the coating of coils, in which context coatings of the invention having comparatively low film thicknesses, <10 μm for example, find use in particular for what are known as presealed or preprimed coils.

EXAMPLES AND COMPARATIVE EXPERIMENTS

Preparation Example 1

The Preparation of Crosslinking Agent (D) for Inventive Use

A reactor equipped with a stirrer, reflux condenser, internal thermometer and inert gas inlet is charged under a nitrogen atmosphere with 10 552 parts of isomers and higher polyfunctional oligomers based on 4,4'-diphenylmethane diisocyanate with an NCO equivalent weight of 135 g/eq (Lupranat®, BASF/Germany; NCO functionality approximately 2.7; amount of 2,2'- and 2,4'-diphenylmethane diisocyanate below 5%). 18 parts of dibutyltin dilaurate are added and 9498 parts of butyldiglycol are added dropwise at a rate such that the product temperature remains below 60° C. Where appropriate, cooling is necessary. Following the end of the addition, the temperature is held at 60° C. for a further 60 minutes and an NCO equivalent weight of 1120 g/eq is found (based on solid fractions). Following dilution in 7768 parts of methyl isobutyl ketone, 933 parts of melted trimethylolpropane are added at a rate such that a product temperature of 100° C. is not exceeded. After the end of addition, the reaction is allowed to continue for 60 minutes more. On the subsequent check, NCO groups are no longer detectable. The product is cooled to 65° C. and at the same time is diluted with 965 parts of n-butanol and 267 parts of methyl isobutyl ketone.

The solids content is 70.1% (1 h at 130° C.).

Preparation Example 2

The Preparation of a Precursor (Solution of Diethylenetriamine-diketimine in Methyl Isobutyl Ketone)

From a 70 percent by weight solution of diethylenetriamine in methyl isobutyl ketone the water of reaction is removed azeotropically at 110-140° C. It is then diluted with methyl isobutyl ketone until the solution has an amine equivalent weight of 124.

Preparation Example 3

The Preparation of a Mixture of Binder (A), Bismuth Salt (B) and Crosslinking Agent (C) for Inventive Use In a reactor fitted with a stirrer, reflux condenser, internal thermometer and an inert gas inlet, 5851 parts by weight of epoxy resin based on bisphenol A and having an epoxy equivalent weight (EEW) of 188 were heated at 125° C. under a nitrogen atmosphere and with stirring together with 1332 parts by weight of bisphenol A, 503 parts by weight of phenol (anhydrous) and 406 parts by weight of xylene. The resulting mixture was stirred further at this temperature for 15 minutes and then heated to 130° C. At this temperature, 22 parts by weight of N,N-dimethylbenzylamine were added. The resulting mixture was stirred further at 130° C. until the EEW reached 851.

Thereafter a mixture of 7066 parts by weight of the crosslinking agent (C) from Preparation Example 1 and 72 parts by weight of a commercial anticrater additive based on a polyether (from Byk Chemie) was added, after which the resulting mixture was held at 100° C. for 30 minutes. Subsequently, 195 parts by weight of butyl glycol and 1209 parts by weight of isobutanol were added.

Immediately thereafter a mixture of 434 parts by weight of the precursor from Preparation Example 2 and 482 parts by weight of methylethanolamine was added, after which the resulting reaction mixture was held at 100° C. for 30 minutes. Its temperature was then raised to 105° C. and 147 parts by weight of N,N-dimethylaminopropylamine were added.

75 minutes after the addition of the amine, 932 parts by weight of a commercial propylene glycol compound (Plastilit® 3060 from BASF Aktiengesellschaft) were added. The resulting mixture was diluted with a commercial mixture of 1-phenoxy-2-propanol and 2-phenoxy-1-propanol (from BASF Aktiengesellschaft) and at the same time was cooled rapidly to 85° C.

Added slowly to this mixture at 85° C. were 719 parts by weight of a 75% strength by weight solution of bismuth(III) 2-ethylhexanoate in 2-ethylhexanoic acid, after which the resulting mixture was stirred at 85° C. until it was homogeneous.

Example 1 and Comparative Experiments C1 and C2

The Preparation of an Aqueous Coating Material for Inventive Use (Example 1) and of Two Aqueous Coating Materials Not for Inventive Use (Comparative Experiments C1 and C2)

For carrying out Example 1 and the Comparative Experiments C1 and C2, the mixture from Preparation Example 3 was divided into three equal parts in order to prepare three dispersions with different acids for the neutralization.

For this purpose, 5054 parts by weight each of the mixture from Preparation Example 3 were transferred to three separate dispersing vessels.

In the case of Example 1, the mixture was admixed with 71.6 parts by weight of formic acid (85% strength in water) and 2434 parts by weight of deionized water.

In the case of Comparative Experiment C1, the mixture was admixed with 79.5 parts by weight of glacial acetic acid and 2426 parts by weight of deionized water.

In the case of Comparative Experiment C2 the mixture was admixed with 144.5 parts by weight of lactic acid (88% strength in water) and 2361 parts by weight of deionized water.

The resulting three dispersions were homogenized for 20 minutes, after which each was diluted further in small portions with 4253 parts by weight of deionized water. The volatile solvents still present in the dispersions were removed by vacuum distillation and replaced by equal quantities of deionized water. This gave the dispersion D1 of Example 1, for inventive use, and the dispersions D2 and D3 of Comparative Experiment C1 of C2, not for inventive use.

The characteristics of the dispersions were as follows:

Dispersion D1:
Solids content: 33% by weight (one hour at 130° C.) 29.5% by weight (0.5 hours at 180° C.)
Base content: 0.79 milliequivalents/g solids (130° C.)
Acid content: 0.60 milliequivalents/g solids (130° C.)
pH: 5.7
Particle size: 105 nm (mass average from photon correlation spectroscopy)

Dispersion D2:
Solids content: 32.8% by weight (one hour at 130° C.) 29.3% by weight (0.5 hours at 180° C.)
Base content: 0.78 milliequivalents/g solids (130° C.)
Acid content: 0.59 milliequivalents/g solids (130° C.)
pH: 5.7
Particle size: 146 nm (mass average from photon correlation spectroscopy)

Dispersion D3:
Solids content: 33.1% by weight (one hour at 130° C.) 29.5% by weight (0.5 hours at 180° C.)
Base content: 0.79 milliequivalents/g solids (130° C.)
Acid content: 0.58 milliequivalents/g solids (130° C.)
pH: 5.8
Particle size: 106 nm (mass average from photon correlation spectroscopy)

Example 2 and Comparative Experiments C3 and C4

The Preparation of an Inventive Coating (Example 2) and of Two Noninventive Coatings (Comparative Experiments C3 and C4)

Dispersion D1 from Example 1 (Example 2) and dispersions D2 and D3 from Comparative Experiments C1 and C2 (Comparative Experiments C3 and C4) were applied directly to bright steel test panels (Bo) from Chemetall as corrosion protection primers, using a doctor blade, and for purposes of visual assessment to glass sheets (190 mm×105 mm). Immediately after their application, the resulting wet films were baked at 170° C. for 20 minutes.

The resulting coatings were assessed visually. Samples of the coatings were taken, pulverized, and subjected to X-ray diffraction analysis in accordance with the Debye-Scherrer method. An examination was made as to whether the X-ray spectra obtained had the above-described six characteristic lines of metallic bismuth.

Table 1 gives an overview of the experimental results obtained.

TABLE 1

Properties of the inventive coating (Example 2) and of the noninventive coatings (Comparative Experiments C3 and C4)

| Example and Comparative Experiment: | 2 | C3 | C4 |
|---|---|---|---|
| Application: | | | |
| to steel test panels film thickness (μm) | 38 | 42 | 41 |
| to glass panels film thickness (μm) | 39 | 45 | 45 |
| Visual assessment: | | | |
| steel test panels: | brown/black | yellow | yellow |
| glass sheets: | brown/black | yellow | yellow |
| X-ray diffraction: | | | |
| metallic bismuth[a] | | | |
| steel test panels: | + | − | − |
| glass panels: | + | − | − |

[a]lattice spacing d intensity (nm)

The experimental results of Table 1 demonstrate that only the dispersion D1 of Example 1 for inventive use (formic acid neutralization) gave coatings with metallic bismuth. These coatings were superior in their corrosion protection effect to the coatings of the Comparative Experiments C3 and C4 (cf. Table 3).

Example 3 and Comparative Experiments C5 and C6

To the Preparation of an Inventive Coating (Example 3) and of Two Noninventive Coatings (Comparative Experiments C5 and C6) by Electrodeposition Coating The inventive electrocoat material EC1 was prepared by diluting dispersion D1 of Example 1 with deionized water (solids content: 15% by weight; 0.5 hours at 180° C.).

The noninventive electrocoat materials EC2 and 3 were prepared by diluting dispersions D2 and D3 of Comparative Experiments C1 and C2 with deionized water (solids content: 15% by weight; 0.5 hours at 180° C.).

After one day of aging at room temperature EC 1 to 3 were deposited on cathodically connected steel test panels with a resistance of 15 ohm. Bright steel test panels (Bo) and water-rinsed, zinc-phosphatized steel test panels (Bo26S W42 OC) from Chemetall were used. The deposition time was two minutes. The bath temperature was 32° C. The deposition voltage was chosen so as to give a film thickness in the baked coatings of from 17 to 21 μm. The deposited wet films were rinsed with deionized water and baked at 170° C. for 20 minutes. Table 2 gives an overview of the composition of EC 1 to 3, the deposition conditions, the film thicknesses obtained, and of whether the resulting coatings contained metallic bismuth or not.

TABLE 2

Composition of EC 1 to 3, deposition conditions, film thicknesses obtained, and metallic bismuth content

| Example and Comparative Experiment: | 3 | C5 | C6 |
|---|---|---|---|
| EC: | | | |
| parts by weight of dispersion | 508 | 512 | 508 |
| parts by weight of water: | 492 | 488 | 492 |
| Deposition: | | | |
| bright steel test panels: | | | |
| voltage (V): | 220 | 220 | 220 |
| film thickness (μm): | 20.1 | 20.1 | 20.4 |
| zinc-phosphatized steel test panels: | | | |
| voltage (V) | 300 | 300 | 300 |
| film thickness (μm): | 18.2 | 18.4 | 18.9 |
| X-ray diffraction: | | | |
| metallic bismuth[a] | | | |
| bright steel test panels: | + | − | − |
| zinc-phosphatized steel test panels: | + | − | − |
| 32.84 | ssss | | |
| 22.65 | ss | | |
| 23.59 | s | | |
| 18.61 | | | |
| 16.49 | | | |
| 15.50 | | | |

[a] lattice spacing d intensity (nm)

The experimental results of Table 2 demonstrate that only the dispersion D1 of Example 1 for inventive use (formic acid neutralization) as an EC gave coatings comprising metallic bismuth.

Examples 4 and 5 and Comparative Experiments C7 to C10

The Corrosion Protection Effect of the Inventive Coatings of Examples 2 and 3 (Examples 4 and 5) and of the Noninventive Coatings of Comparative Experiments C3 to C6 (Comparative Experiments C7 to C10)

In the case of Example 4, the corrosion protection effect of the inventive coating of Example 2 was determined on bright steel test panels.

In the case of Example 5, the corrosion protection effect of the inventive coatings of Example 3 was determined on bright and zinc-phosphatized steel test panels.

In the case of Comparative Experiment C7, the corrosion protection effect of the noninventive coating of Comparative Experiment C3 was determined on bright steel test panels.

In the case of Comparative Experiment C8, the corrosion protection effect of the noninventive coating of Comparative Experiment C4 was determined on bright steel test panels.

In the case of Comparative Experiment C9, the corrosion protection effect of the noninventive coatings of Comparative Experiment C5 was determined on bright and zinc-phosphatized steel test panels.

In the case of Comparative Experiment C10, the corrosion protection effect of the noninventive coatings of Comparative Experiment C6 was determined on bright and zinc-phosphatized steel test panels.

The results of the measurements can be found in Table 3.

TABLE 3

The corrosion protection effect of the inventive coatings of Examples 2 and 3 (Examples 4 and 5) and of the noninventive coatings of Comparative Experiments C3 to C6 (Comparative Experiments C7 to C10)

| Example and Comparative Experiment: | 4 | 5 | C7 | C8 | C9 | C10 |
|---|---|---|---|---|---|---|
| 360 hours salt spray mist exposure[a]: | | | | | | |
| Scribe creep[b] (mm): | 1.1 | 1.2 | 1.9 | 1.8 | 1.8 | 2.0 |
| Surface rust[c]: | 1 | 1 | 1 | 1 | 1 | 1 |
| Climatic cycling test[d]: | | | | | | |
| Scribe creep[b] (mm): | — | 1.9 | — | — | 2.3 | 2.3 |
| Surface rust[c]: | — | 1 | — | — | 1 | 1 |

[a] 360 hours of treatment with salt spray mist in accordance with ASTM B 117 of coatings on bright steel test panels;
[b] creep (mm) = [total creep (mm) - scribe thickness (mm)]/2;
[c] 0 = best score; 5 = worst score;
[d] 10 cycles of climatic testing according to VDA [German automakers association] of coatings on zinc-phosphatized steel test panels;

The results of Table 3 underscore the superior corrosion protection effect of the inventive coatings.

The invention claimed is:

1. A coating on a metallic substrate prepared from a thermally curable, organic-based aqueous coating material comprising colloidally dispersed metallic bismuth, present in an amount between from 0.01 to 2.5% by weight, based on total amount of the coating, and at least one alkanemonocarboxylic acid having at least 5 carbon atoms in the alkane and the alkane consists of the alkane, wherein the colloidally dispersed metallic bismuth is provided from at least one salt of bismuth that is present in an amount greater than an amount of the at least one alkanemonocarboxylic acid in the coating material and wherein the bismuth in the coating provides heavy corrosion protection.

2. The coating of claim 1, wherein the coating has a film thickness of from 2.0 to 200 μm.

3. The coating of claim 1, wherein the thermally curable, organic-based aqueous coating material is deposited by one of spraying, knife coating, brushing, flow coating, dipping, impregnating, trickling, or rolling on one of an electrically conductive substrate and an electrically nonconductive substrate.

4. The coating of claim 1, wherein the thermally curable, organic-based aqueous coating material is deposited cataphoretically on an electrically conductive substrate.

5. A method of making the coating of claim 1 comprising:
  I) providing the thermally curable, organic-based aqueous coating material, and
  II) applying and forming the coating on the metallic substrate.

* * * * *